(12) United States Patent
Yoshida et al.

(10) Patent No.: US 10,797,980 B2
(45) Date of Patent: Oct. 6, 2020

(54) INFORMATION NOTIFYING APPARATUS

(71) Applicant: Mitsubishi Electric Corporation, Tokyo (JP)

(72) Inventors: Ryo Yoshida, Tokyo (JP); Kosuke Nakajima, Tokyo (JP); Satoko Sakajo, Tokyo (JP); Shingo Soma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/099,747

(22) PCT Filed: Jul. 1, 2016

(86) PCT No.: PCT/JP2016/069611
§ 371 (c)(1),
(2) Date: Nov. 8, 2018

(87) PCT Pub. No.: WO2018/003110
PCT Pub. Date: Jan. 4, 2018

(65) Prior Publication Data
US 2019/0140928 A1 May 9, 2019

(51) Int. Cl.
*H04L 12/26* (2006.01)
*H04M 11/00* (2006.01)
(Continued)

(52) U.S. Cl.
CPC ....... *H04L 43/0817* (2013.01); *G06Q 10/101* (2013.01); *G06Q 10/20* (2013.01);
(Continued)

(58) Field of Classification Search
CPC ............ H04L 43/0817; H04L 41/0668; H04L 41/0677; H04L 67/125; H04L 67/42;
(Continued)

(56) References Cited

U.S. PATENT DOCUMENTS

2002/0055358 A1* 5/2002 Hebert ................... H04L 29/06
455/423
2002/0128728 A1 9/2002 Murakami et al.
(Continued)

FOREIGN PATENT DOCUMENTS

JP 2002-297804 A 10/2002
JP 2002-342185 A 11/2002
(Continued)

OTHER PUBLICATIONS

Webhvac, Will Running an Air Conditioner in Cold Weather Damage It?, Feb. 10, 2012, www.webhvac.com,https://web.archive.org/web/20120210202753/https://www.webhvac.com/2012/01/will-running-an-air-conditioner-in-cold-weather-damage-it/ (Year: 2012).*
(Continued)

*Primary Examiner* — Zi Ye
(74) *Attorney, Agent, or Firm* — Posz Law Group, PLC

(57) ABSTRACT

The present invention is to analyze information collected from each device via a network to a server, thereby not only detecting an abnormal state of the device itself, but also proposing replacement with another device being the most beneficial in a user's life or presenting an beneficial usage. An information notifying apparatus according to the present invention is further comprising: an information receiving unit configured to receive usage information transmitted from an electric device on a client side; an external condition information acquiring unit configured to acquire external condition information relating to performance or an operation state of the electric device; a presented information determining unit configured to determine information to be notified to a user based on the usage information and the external condition information; and an information transmitting unit configured to transmit the information deter-
(Continued)

mined by the presented information determining unit to a display device.

8 Claims, 3 Drawing Sheets

(51) Int. Cl.
| | | |
|---|---|---|
| *H04Q 9/00* | (2006.01) | |
| *G06Q 10/10* | (2012.01) | |
| *G06Q 10/00* | (2012.01) | |
| *G06Q 30/00* | (2012.01) | |
| *H04L 12/24* | (2006.01) | |
| *H04L 29/08* | (2006.01) | |
| *H04L 29/06* | (2006.01) | |

(52) U.S. Cl.
CPC ........... *G06Q 30/01* (2013.01); *G06Q 30/012* (2013.01); *H04L 41/0668* (2013.01); *H04L 41/0677* (2013.01); *H04L 67/125* (2013.01); *H04L 67/42* (2013.01); *H04M 11/00* (2013.01); *H04Q 9/00* (2013.01)

(58) Field of Classification Search
CPC ...... G06Q 10/101; G06Q 10/20; G06Q 30/01; G06Q 30/012
USPC ........................................................ 709/224
See application file for complete search history.

(56) References Cited

U.S. PATENT DOCUMENTS

| | | |
|---|---|---|
| 2005/0257006 A1 | 11/2005 | Yoshida et al. |
| 2009/0012650 A1* | 1/2009 | Wang ................. F24F 11/30 700/276 |
| 2013/0050511 A1* | 2/2013 | Derby ................ G06Q 50/06 348/207.1 |
| 2015/0195158 A1 | 7/2015 | Nakano et al. |
| 2015/0205275 A1 | 7/2015 | Nakano et al. |
| 2016/0006576 A1 | 1/2016 | Matsuzaki et al. |

FOREIGN PATENT DOCUMENTS

| | | |
|---|---|---|
| JP | 2004-214785 A | 7/2004 |
| JP | 2006-023051 A | 1/2006 |
| WO | 2004/010232 A1 | 1/2004 |
| WO | 2013/118142 A2 | 8/2013 |

OTHER PUBLICATIONS

Extended European Search Report dated Mar. 1, 2019 issued in corresponding EP patent application No. 16907343.4.
International Search Report of the International Searching Authority dated Aug. 6, 2016 for the corresponding international application No. PCT/JP2016/069611 (and English translation).
Office Action dated May 25, 2020 issued in corresponding EP patent application No. 16907343.4.

* cited by examiner

INFORMATION NOTIFYING APPARATUS

CROSS REFERENCE TO RELATED APPLICATION

This application is a U.S. national stage application of PCT/JP2016/069611 filed on Jul. 1, 2016, the contents of which are incorporated herein by reference.

TECHNICAL FIELD

The present invention relates to an information notifying apparatus for collecting and analyzing information from a home electric product to notify replacement with a product providing more benefits or a more beneficial usage.

BACKGROUND ART

Conventionally, in an office device such as a printer, a copier, and a fax, the state of the device is determined based on information on the used amount of ink or other material or information on quality, and replacement timing of the device, maintenance inspection timing, replenishment timing of supplies, cost information on device use, or other information is output as a report to notify a user of maintenance and management (Patent Literature 1).

CITATION LIST

Patent Literature

Patent Literature 1: Japanese Unexamined Patent Application Publication No. 2002-297804

SUMMARY OF INVENTION

Technical Problem

However, the office device disclosed in Patent Literature 1 described above is for determining failure or necessity of maintenance using a sensor installed inside each device or other measures. Therefore, it performs only maintenance and management based on detection of an abnormal state of a device, so it is difficult to make a proposal assuming a lot of information such as replacement with another device providing more benefits or a more beneficial usage.

So, the present invention has been made to solve such a problem, and is to analyze information collected from each device via a network to a server, thereby not only detecting an abnormal state of the device itself, but also proposing replacement with another device being the most beneficial in a user's life or presenting an beneficial usage.

Solution to Problem

An information notifying apparatus according to one embodiment of the present invention comprises: an information receiving unit configured to receive usage information transmitted from an electric device on a client side; an external condition information acquiring unit configured to acquire external condition information relating to performance or an operation state of the electric device; a presented information determining unit configured to determine information to be notified to a user based on the usage information and the external condition information; and an information transmitting unit configured to transmit the information determined by the presented information determining unit to a display device.

Advantageous Effects of Invention

Since the information notifying apparatus according to one embodiment of the present invention comprises: an information receiving unit configured to receive usage information transmitted from an electric device on a client side; an external condition information acquiring unit configured to acquire external condition information relating to performance or an operation state of the electric device; and a presented information determining unit configured to determine information to be notified to a user based on the usage information and the external condition information, it is possible not only to detect an abnormal state of the device itself, but also to propose replacement with another device being the most beneficial in a user's life or to present an beneficial usage.

DESCRIPTION OF EMBODIMENTS

Embodiments

Figure 1:
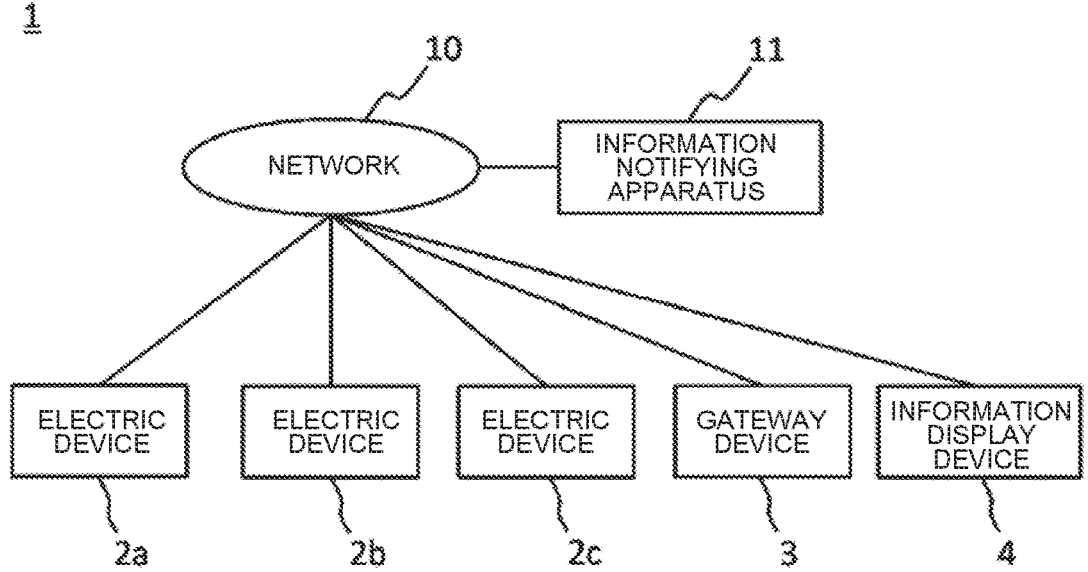
FIG. 1 is a diagram showing a configuration of an information notifying system using an information notifying apparatus according to the present invention.
Figure 2:
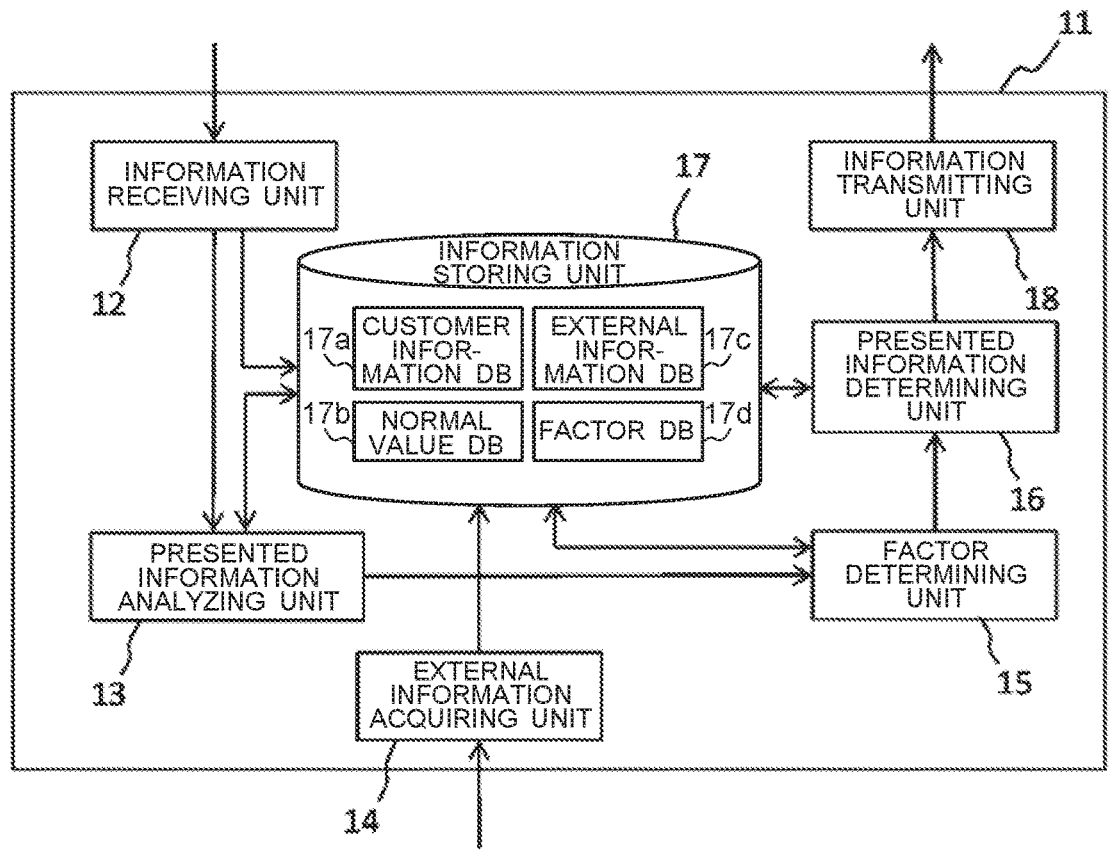
FIG. 2 is a function configuration diagram of the information notifying apparatus according to the present invention.
Figure 3:
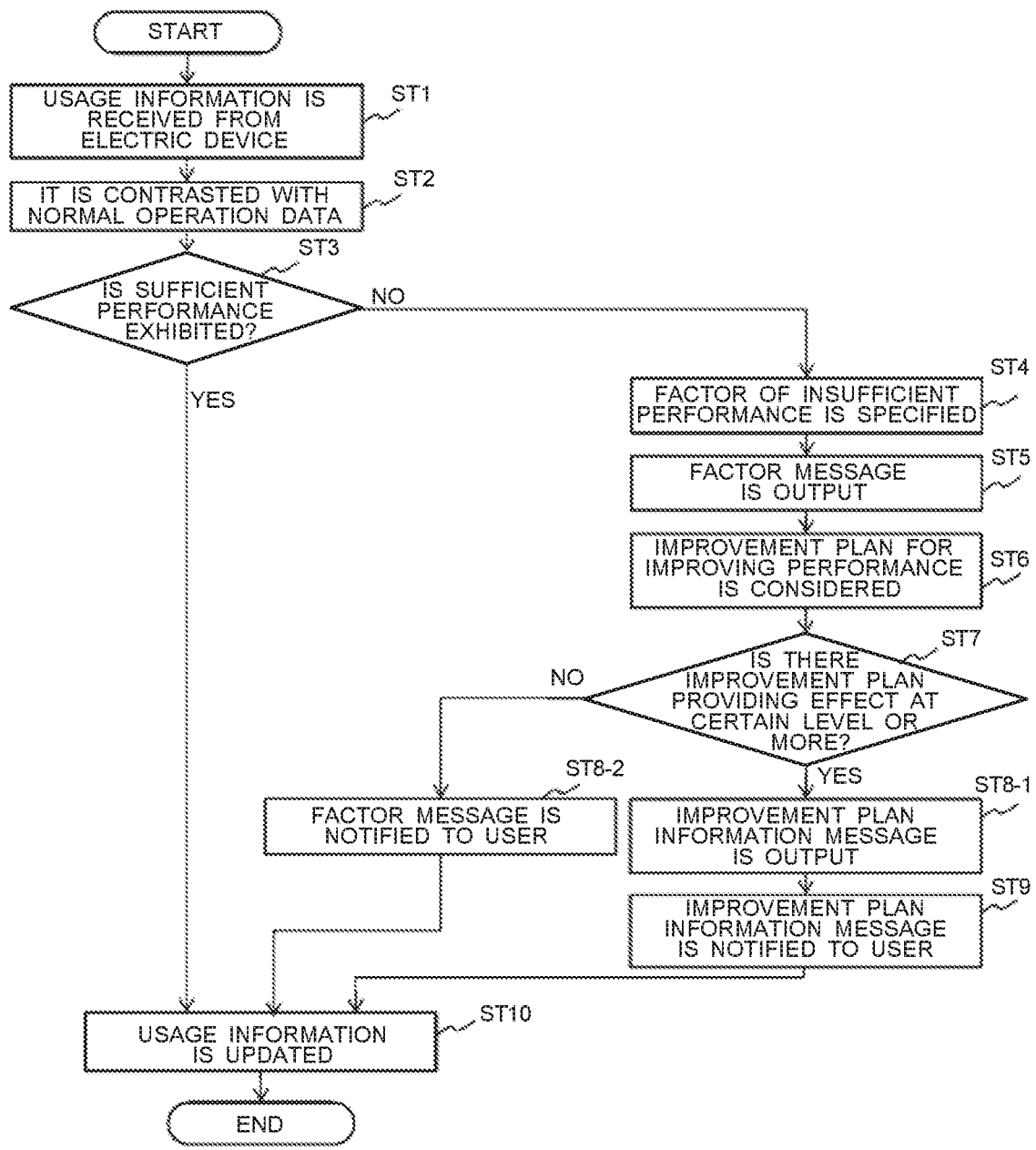
FIG. 3 is a flowchart showing operation of the information notifying apparatus according to the present invention.
Figure 4:
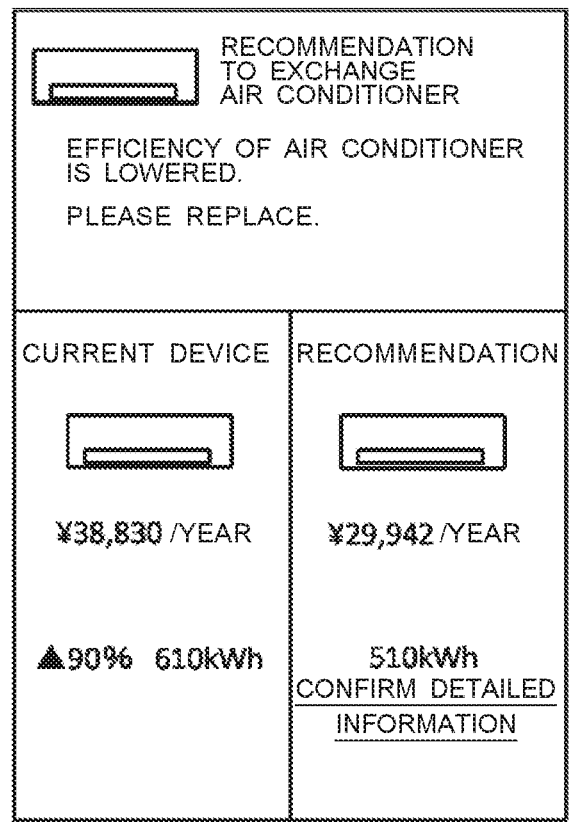
FIG. 4 is a diagram showing an example of display urging replacement of a device to be notified to a client.
Figure 5:
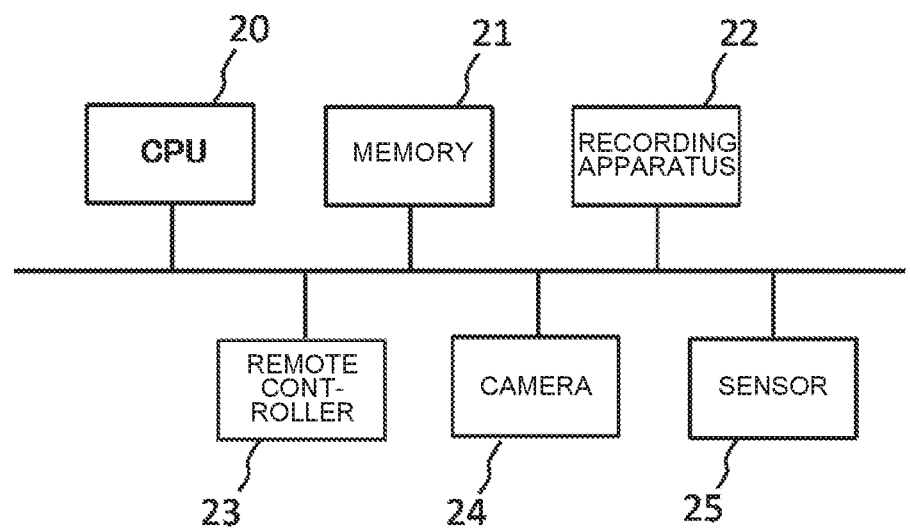
FIG. 5 is a hardware configuration diagram of the information notifying apparatus according to the present invention.

A configuration of an information notifying apparatus according to Embodiment 1 of the present invention will be described using FIGS. 1-5. FIG. 1 is a diagram showing a configuration of an information notifying system using an information notifying apparatus according to the present invention. FIG. 2 is a function configuration diagram of the information notifying apparatus according to Embodiment 1. FIG. 3 is a flowchart showing operation of the information notifying apparatus according to Embodiment 1. FIG. 4 is a diagram showing an example of display urging replacement of a device to be notified to a client. FIG. 5 is a hardware configuration diagram of the information notifying apparatus according to the present invention.

As shown in FIG. 1, an information notifying system 1 according to Embodiment 1 comprises a plurality of electric devices 2a-2c connected to a network 10 such as the Internet, a gateway device 3, an information display device 4, and an information notifying apparatus 11. Note that when referring to any electric device of the plurality of electric devices 2a-2c in the description below, "an electric device 2" will be used.

An electric device 2 is, for example, an air-conditioning apparatus such as an air conditioner, a refrigerator, an electronic cooker, or a video device such as a TV. Although only three electric devices 2 are connected in FIG. 1, of course the number of devices may not be limited to three.

The gateway device 3 functions to connect different networks to each other. Note that either a method in which each electric device 2 arranged on a client side performs direct transmission to the information notifying apparatus 11, or a method in which each device once sends data to a dedicated device such as the gateway device 3, and the gateway device 3 collectively transmits information to the information notifying apparatus 11 is possible.

The information display device 4 is arranged on the client side, is for displaying information sent from the information notifying apparatus 11, and is, for example, a smartphone, a tablet, or a personal computer. Note that the gateway device 3 or an electric device 2 may double as the information display device 4.

The information notifying apparatus 11 collects usage information from an electric device 2 arranged on the client side, and compares it with a database in the information notifying apparatus 11 to analyze whether sufficient performance is obtained in the electric device 2. Furthermore, the information notifying apparatus 11 determines information to be notified to a user based on the analyzed information, and transmits the information to the information display device 4.

FIG. 2 is a function configuration diagram of the information notifying apparatus according to the present invention. As shown in FIG. 2, the information notifying apparatus 11 is composed of an information receiving unit 12, a presented information analyzing unit 13, an external condition information acquiring unit 14, a factor determining unit 15, a presented information determining unit 16, an information storing unit 17, and an information transmitting unit 18.

The information receiving unit 12 receives usage information on operation of each electric device 2 from electric devices 2 or the gateway apparatus 3 arranged on the client side via the network 10. For example, when an electric device 2 is an air-conditioning apparatus such as an air conditioner, the usage information is information on power consumption or temperature change per time. In addition, the usage information may include different information depending on the type of each electric device 2. When receiving the usage information, the information receiving unit 12 notifies the presented information analyzing unit 13 of the reception. Furthermore, the information receiving unit 12 transmits the usage information to the information storing unit 17 to cause the usage information to be stored in a client information database 17a of the information storing unit 17.

The information storing unit 17 comprises the client information database 17a (described as "client information DB" in FIG. 2), a normal value database 17b (described as "normal value DB" in FIG. 2), an external condition information database 17c (described as "external condition information DB" in FIG. 2), and a factor database 17d (described as "factor DB" in FIG. 2). The client information database 17a stores information on the product of an electric device 2 and the usage information sent from the electric device 2 in a manner linked to a client ID. The normal value database 17b stores theoretical operation information in the case where an electric device 2 performs normal operation in a manner linked to the information on the product of the electric device 2. By contrasting the usage information with the theoretical operation information, it can be determined whether performance can be exhibited. The external condition information database 17c stores product information on other products or new products as external condition information. Additionally, the external condition information stores information on the performance of an electric device 2, for example, weather information such as temperature, weather, and humidity, time information such as a season, and a date and time, position information such as a location, housing information such as a room size, room layout, a housing form, and furniture arrangement, and family information such as a family composition. The factor database 17d stores a usage information patter for each factor in a case where the performance of an electric device 2 is not sufficiently exhibited. Note that as a method for storing information in the client data information database 17a, the normal value database 17b, the external condition information database 17c, and the factor database 17d, a user may directly input it using an input terminal such as a tablet, or it may be collected from an external network. Additionally, it may be collected from information from various sensors arranged in the periphery of an electric device 2 or a client, or video from a camera or other devices. The various sensors are, for example, a temperature sensor, a humidity sensor, an infrared sensor, and other sensors.

When receiving a notification of reception of the usage information from the information receiving unit 12, the presented information analyzing unit 13 accesses the client information database 17a of the information storing unit 17 to extract the usage information. Furthermore, the presented information analyzing unit 13 accesses the normal value database 17b to extract the theoretical operation information of an electric device 2 having transmitted the usage information. Then, the presented information analyzing unit 13 compares the usage information with the theoretical operation information to determine whether sufficient performance is obtained. The presented information analyzing unit 13 transmits the determination result to the factor determining unit 15. Note that whether sufficient performance is obtained can be determined here by scoring elements related to electric energy, power consumption, an electricity price, and a temperature change in the usage information. For example, it is determined that performance is exhibited when the score is equal to or greater than a predetermined value, and it is determined that performance is not exhibited when it is equal to or smaller than the predetermined value. In addition, it may be determined using a percentage obtained by dividing an element related to the usage information by the theoretical operation information instead of scoring.

The external condition information acquiring unit 14 receives the above external condition information, and causes it to be stored in the client data information database 17a, the normal value database 17b, the external condition information database 17c, and the factor database 17d of the information storing unit 17 in a sorted manner.

The factor determining unit 15 receives information on the determination result from the presented information analyzing unit 13, and when the information indicates that sufficient performance is not obtained, accesses the client information database 17a, the external condition information database 17c, and the factor database 17d of the information storing unit 17. Then, the factor determining unit 15 extracts the usage information from the client information database 17a, the external condition information from the external condition information database 17c, and usage information patterns related to factors from the factor database 17d. Based on the usage information, the external condition information, and the usage information patterns, the factor determining unit 15 specifies a factor contributing to insufficient performance of the electric device 2. Specifically, the factor determining unit 15 collates factor information derived from the usage information and the external condition information with the usage information patterns to extract the most similar usage information pattern to the factor information, thereby specifying a factor. Note that although the factor information is described as being derived from the usage information and the external condition information, it should just be extracted based on the usage information when there is no external condition information. Furthermore, the factor determining unit 15 creates a factor message indicating the specified factor. Then, the factor determining unit 15 transmits information on the factor and the factor message to the presented information determining unit 16.

When receiving the information indicating the factor and the factor message transmitted from the factor determining unit 15, the presented information determining unit 16 accesses the information storing unit 17 to extract the usage information from the client information database 17a and the external condition information from the external condition information database 17c. Then, the presented information determining unit 16 resolves an improvement plan for improvement against the factor of insufficient performance based on the usage information and the external condition information. As the method, for example, the presented information determining unit 16 extracts product information on new products or other products from the external condition information database 17c. Furthermore, a use condition on the client side on which the electric device 2 is used is determined from the obtained usage information. Then, virtual usage information in the case of applying the product information on new products or other products to the use condition is measured. When a certain improvement effect in the virtual usage information is obtained from this measurement result, the virtual usage information is output as improvement plan information. As another example, the presented information determining unit 16 extracts housing information such as a room size, room layout, a housing form, and furniture arrangement from the external condition information database 17c. Furthermore, a use condition on the client side on which the electric device 2 is used is determined from the obtained usage information. As the use condition, for example, virtual usage information of each pattern in the case of changing furniture arrangement is measured. When a certain improvement effect in the virtual usage information is obtained from this measurement result, the virtual usage information is output as improvement plan information. Then, the presented information determining unit 16 creates an improvement plan information message as shown in FIG. 4, and transmits this improvement plan information message to the information transmitting unit 18.

The information transmitting unit 18 transmits the improvement plan information message and the factor message transmitted from the presented information determining unit 16 to the information display device 4 on the client side. Note that although both the improvement plan information message and the factor message are transmitted to the client side, only either one may be transmitted. Meanwhile, when it is determined in the presented information analyzing unit 13 that sufficient performance is obtained now, the information transmitting unit 18 may send information indicating that sufficient performance is obtained to the information display device, or may not send any information.

FIG. 3 is a flowchart showing operation of the information notifying apparatus according to the present invention. Operation of the information notifying apparatus in a case where an electric device 2 is an air conditioner, and temperature information and new product information are used as the external condition information will be described here as an example.

When the operation of the air conditioner on the client side is started, the information receiving unit 12 of the information notifying apparatus 2 receives usage information on operation from the air conditioner or the gateway apparatus 3 arranged on the client side via the network 10 (ST1). Then, when receiving the usage information, the information receiving unit 12 notifies the presented information analyzing unit 13 of the reception.

When receiving a notification of reception of the usage information from the information receiving unit 12, the presented information analyzing unit 13 contrasts the usage information with the theoretical operation information of the air conditioner (ST2). The presented information analyzing unit 13 compares the usage information with the theoretical operation information to determine whether sufficient performance is obtained or not (ST3). When sufficient performance is exhibited in the air conditioner as a result of the determination (ST3—YES), no notification is sent to the client side, or a message indicating that sufficient performance is exhibited is transmitted to the information display device 4. Then, subsequently the usage information is updated, and the next usage information is determined (ST10).

When sufficient performance is not exhibited in the air conditioner as a result of determination by the presented information analyzing unit 13 (ST3—NO), a factor of insufficient performance is specified. The factor determining unit 15 specifies a factor of insufficient performance of the electric device 2 based on the usage information, the temperature information, and the usage information patterns. Sufficiently, the factor determining unit 15 collates the factor information derived from the usage information and the temperature information with the usage information patterns to extract the most similar usage information pattern to the factor information, thereby specifying the factor (ST4). Furthermore, the factor determining unit 15 generates a factor message indicating the specified factor (ST5).

When receiving the information indicating the factor and the factor message transmitted from the factor determining unit 15, the presented information determining unit 16 resolves an improvement plan for determining the factor of insufficient performance based on the usage information and the new product information. The presented information determining unit 16 extracts product information on a new-type air conditioner from the external condition information database 17c. Furthermore, a use condition on the client side on which the air conditioner is used is determined from the obtained usage information. Then, virtual usage information in the case of applying the product information on the new-type air conditioner to the use condition is measured (ST6). When a certain improvement effect in the virtual usage information is obtained from this measurement result (ST7—YES), the virtual usage information is output as improvement plan information (ST8-1). Then, the presented information determining unit 16 creates an improvement plan information message, and notifies the client of this message (ST9). Subsequently the usage information is updated, and the next usage information is determined (ST10).

In addition, when a certain improvement effect in the virtual usage information is not obtained from this measurement result (ST7—NO), the factor message generated in the factor determining unit is output (ST8-2). Subsequently the usage information is updated, and the next usage information is determined (ST10).

Since the present invention presents information to a user based on the usage information transmitted from an electric device on the client side and the external condition information relating to the performance or operation state of the electric device, it is possible to propose replacement with another device being the most beneficial in a user's life or an beneficial usage.

FIG. 5 is a hardware configuration diagram of the information notifying apparatus according to the present invention. The information notifying apparatus 11 according to the present invention has a configuration of a general computer, and has, for example, a CPU (Central Processing Unit) 20, a memory 21, a recording apparatus 22, a remote controller 23, a camera 24, a sensor 25, and a display apparatus 26, which are connected by a bus or other measures.

The CPU 20 is, for example, an arithmetic apparatus reading a program or data from the recording apparatus 6 or other apparatuses, and executing a process to realize each function provided in the information notifying apparatus 11. For example, the CPU 20 executes a program for the information notifying apparatus 11 to realize each function of the information receiving unit 12, the presented information analyzing unit 13, the external condition information acquiring unit 14, the factor determining unit 15, the presented information determining unit 16, and the information transmitting unit 18.

The memory 21 includes, for example, a storage apparatus such as a RAM (Random Access Memory) or a ROM (Read Only Memory). The RAM is a volatile memory used as a working area of the CPU 20 or other areas. The ROM is, for example, a non-volatile memory storing a startup program, setting values, or other information of the information notifying apparatus 11.

The recording apparatus 22 is, for example, a storage apparatus in which a program for device control, information communication control, or other control executed by the CPU 20, data, or other information are recorded, and is composed of, for example, an HDD (Hard Disk Device), an SSD (Solid State Drive), a flash ROM, or other storage.

The remote controller 23 is a unit through which the information notifying apparatus 11 receives a user operation such as an operation button, a keyboard, or other devices.

The camera 24 is, for example, an image capturing unit for capturing an image of the layout of a room in which an electric device 2 on the client side is installed, furniture arrangement, or the like. The camera 8 converts the captured image of a conference or other events into predetermined image data, and transmits it to the CPU 20 or other devices via the bus or other media. At this time, for example, the camera 24 can change the brightness or other parameters of the captured image based on set camera parameters or other parameters. For example, the camera 24 has default camera parameters, and the values of the camera parameters can be dynamically changed by a program running on the CPU 20 or other measures.

For example, the sensor 25 is for detecting the peripheral situation of a room in which the electric device 2 on the client side is installed, and converts it into predetermined data for transmission to the CPU 20 or other devices via the bus. The sensor 25 is, for example, a temperature sensor, a humidity sensor, an infrared sensor, or other sensors.

REFERENCE SIGNS LIST 1 information notifying system 2a electric device 2b electric device 2c electric device 3 gateway device 4 information display device 10 network 11 information notifying apparatus 12 information receiving unit 13 presented information analyzing unit 14 external condition information acquiring unit 15 factor determining unit 16 presented information determining unit 17 information storing unit 17a client information database 17b normal value database 17c external condition information database 17d factor database 18 information transmitting unit 20 CPU 21 memory 22 storage apparatus 23 remote controller
24 camera 25 sensor

The invention claimed is:

1. An information notifying apparatus comprising:
a processor configured to execute a program;
an external condition information database which stores product information on other products or new products as external condition information;
a factor database which stores a usage information pattern for each factor in a case where the performance of an electric device is not sufficiently exhibited; and
a memory configured to store the program, the program being executed by the processor to
receive usage information transmitted from an electric device on a client side,
analyze, based on the usage information, whether sufficient performance of the electric device which is used is obtained,
when analyzing that the sufficient performance of the electric device is not obtained, specify a factor contributing to insufficient performance and create a factor message indicating the factor for the electric device which is used, wherein the factor is determined based on the received usage information and usage information patterns related to factors from the factor database,
determine a use condition on the client side on which the electric device is used from the received usage information;
measure virtual usage information in response to applying, to the use condition, the product information on the other products or new products stored in the external condition information database;
determine an improvement plan for improving against the factor contributing to insufficient performance and create an improvement plan information message, determine whether the improvement plan provides a predetermined improvement effect in the virtual usage information at at least a predetermined level from a result of measuring the virtual usage information for the other products or new products as applied to the use condition,
when the improvement plan is determined to provide the predetermined improvement effect at at least the predetermined level, transmit, to a display device, the improvement plan information message that specifies a recommendation of at least one of the other products or new products, and
when the improvement plan is not determined to provide the predetermined improvement effect at at least the predetermined level, transmit, to the display device, the factor message for the electric device which is used.

2. The information notifying apparatus of claim 1, wherein the program is executed by the processor to acquire external condition information relating to performance or an operation state of the electric device; and determine the improvement plan for improving against the factor contributing to the insufficient performance based on the usage information and the external condition information.

3. The information notifying apparatus of claim 2, wherein the external condition information relating to performance is information on an electric device of a same type as the electric device.

4. The information notifying apparatus of claim 2, wherein when the electric device is an air-conditioning apparatus, the external condition information relating to an operation state is information on at least any one of weather, temperature, humidity, a room size, room layout, and furniture arrangement.

5. The information notifying apparatus of claim 2, wherein the program is executed by the processor to collect the external condition information via a network.

6. The information notifying apparatus of claim 2, further comprising an inputting unit through which the external condition information can be input.

7. The information notifying apparatus of claim 2, further comprising an information detector provided around the electric device and configured to detect ambient information on the client side, wherein the program is executed by the processor to determine the improvement plan for improving against the factor contributing to the insufficient performance, based on the usage information, the external condition information and the ambient information.

8. The information notifying apparatus of claim 1, wherein
  the product information extracted from the external condition information database relates to a new-type of the electric device, and
  the improvement plan information message recommends the new-type of the electric device based on applying, to the use condition, the new-type of the electric device to the usage information transmitted from the electric device on the client side.

\* \* \* \* \*